United States Patent [19]

Munse

[11] 3,722,041
[45] Mar. 27, 1973

[54] RING CLAMP
[75] Inventor: Robert A. Munse, Troy, Mich.
[73] Assignee: Microdot Inc., Troy Mich.
[22] Filed: July 13, 1971
[21] Appl. No.: 162,174

[52] U.S. Cl. ................................24/283, 24/279
[51] Int. Cl. ..........................................B65d 63/02
[58] Field of Search..............24/275, 279, 280, 283

[56] References Cited

UNITED STATES PATENTS

| | | | |
|---|---|---|---|
| 1,272,541 | 7/1918 | Scott | 24/279 |
| 1,070,952 | 8/1913 | Erickson | 24/279 |
| 1,999,683 | 4/1935 | Borresen | 24/275 |
| 2,685,193 | 8/1954 | Marymont | 24/237 |
| 3,261,577 | 7/1966 | De Gryse et al. | 24/279 |

FOREIGN PATENTS OR APPLICATIONS

| | | | |
|---|---|---|---|
| 439,844 | 12/1935 | Great Britain | 24/283 |
| 1,013,352 | 10/1964 | Great Britain | 24/279 |

Primary Examiner—Bernard A. Gelak
Assistant Examiner—Darrell Marquette
Attorney—J. King Harness et al.

[57] ABSTRACT

A ring is constructed from a length of wire formed into a circle with the ends bent at right angle and tilted at an angle away from each other. The ends are flattened normal to the plane of the ring to form parallel flanges through which apertures are provided. The aperture in one of the flanges is threaded for supporting a screw of substantial length having a head at one end and a reduced cylindrical nib at the other end which extends into the aperture of the other flange. When the ends of the ring are offset and overlapped the nib at the end of the screw extends into the aperture in the other flange and due to the opposite angular tilt to the flanges the axis of the screw falls in a plane through the engaged sides of the ring. By advancing the screw through the threaded aperture the flanges are moved away from each other thereby tightening the ring about a tube to be sealed.

1 Claim, 7 Drawing Figures

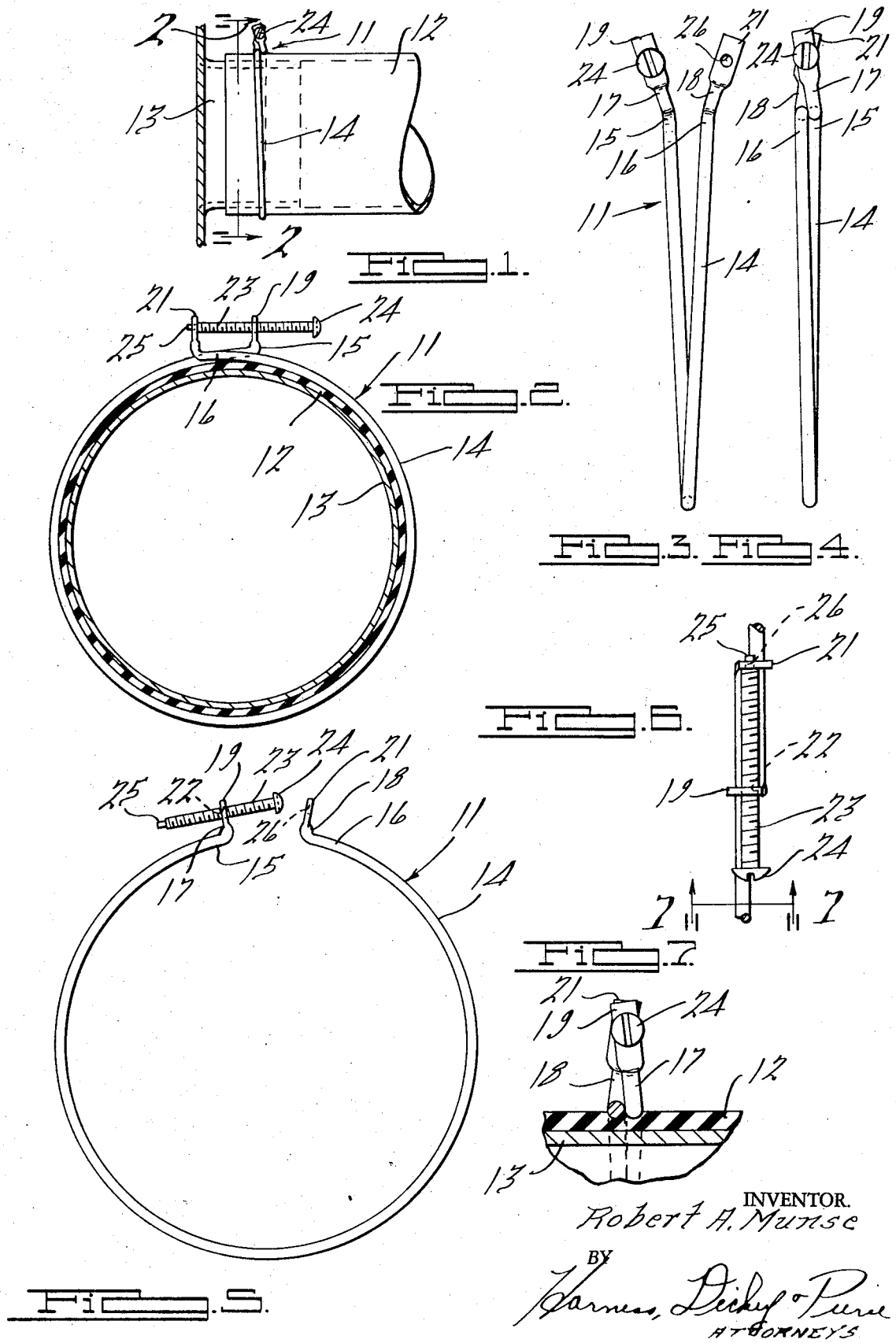

RING CLAMP

BACKGROUND OF THE INVENTION

Reference may be had to U.S. Pat. Nos. 1,999,683 and 2,349,809 which were uncovered in a search and are of interest relative to the clamping ring of the present invention.

SUMMARY OF THE INVENTION

The ring clamp of the present invention is of simple construction made from a length of wire which is formed into a circle with the ends bent at right angle and in outward angular relation to a plane through the ring. The ends are flattened to form flanges which extend outwardly of the ring in parallel relation to each other transversely of the plane of the ring. An aperture is provided in each of the flanges which are in alignment when the ends of the ring overlap in side engagement with each other. The aperture in one flange is threaded to receive a screw having a driving head at one end and a cylindrical nib on the other end. The aperture in the other flange is insertable over the nib of the screw which when driven moves the flanges toward or away from each other. The ring may be placed over a tube to be clamped when the nib of the screw engages the aperture of the flange or after the tube is in position the ring may be spread to extend therearound. By driving the screw to separate the flanges the ring will assume a shorter diameter and thereby clamp the tube in secured position. The outward angular position of the flanges positions the axis of the screw in a plane through the engaged sides and the ring.

BRIEF DESCRIPTION OF THE DRAWING

FIG. 1 is a broken view of a tube secured to a sleeve by a clamp embodying features of the present invention;

FIG. 2 is an enlarged sectional view of the structure illustrated in FIG. 1, taken on the line 2—2 thereof;

FIG. 3 is an edge view of the ring illustrated in FIG. 2 with the ends in disconnected relation;

FIG. 4 is a view of the structure illustrated in FIG. 3 when the ends of the ring are in engaged relation;

FIG. 5 is a side view of the structure illustrated in FIG. 3;

FIG. 6 is a broken plan view of the structure illustrated in FIG. 4, as viewed from the top thereof, and FIG. 7 is a sectional view of the structure illustrated in FIG. 6, taken on the line 7—7 thereof with the ring shown clamped onto a tube.

DESCRIPTION OF THE PREFERRED EMBODIMENT

The ring clamp 11 of the present invention is illustrated in FIG. 1 as securing a flexible tube 12 onto a sleeve 13. The ring clamp 11 comprises a wire 14 bent in circular form which in the free state has the end sections 15 and 16 in lateral and circular spaced apart relation, as illustrated in FIGS. 3 and 5. Clamping ends 17 and 18 are bent outwardly at right angles to the sections 15 and 16 and are flattened to provide flanges 19 and 21. The clamping end 17 and flange 19 are bent outwardly at an angle to the end section 15. The clamping end 18 and the flange 21 are also bent outwardly at an angle to the end section 16.

The flange 19 has a threaded aperture 22 in which a screw 23 is threadedly retained. The screw has a driving head 24 on one end and a cylindrical nib 25 on the other. The flange 21 has an aperture 26 through which the nib 25 extends when the end sections 15 and 16 are moved transversely and advanced circularly past each other to have the adjacent sides in abutted relation, as illustrated in FIG. 4, in which they are retained by the lateral tension in the two end sections. The ring is decreased in diameter to permit the aperture 26 in the flange 21 to be disposed over the nib 25 where it is retained by the tension in the ring which tends to produce its expansion.

The flanges 19 and 21 are disposed in parallel relation to each other transverse of a plane through the ring and the angle at which they are positioned laterally is such as to have the flanges cross each other to have the axis of the screw located in a plane through the abutted sides and the ring. After the end sections 15 and 16 are secured together in this manner, the ring may be placed over the tube 12 and the tube inserted over the sleeve 13. Thereafter, the head 24 of the screw 23 is driven to spread the flanges 19 and 21 apart to reduce the diameter of the ring 14 and clamp the tube 12 on the sleeve 13. If the tube 12 has been assembled on the sleeve 13, the end sections 15 and 16 can be spread apart and disposed over the tube after which the aperture 26 through the flange 21 is moved over the nib 25 and the ring tightened on the tube 12 by the driving of the screw 23.

The flanges 19 and 21 are preferably formed by cold working which increases the hardness of the material and provides strength to the thread of the aperture 22 and assurance that the thread will not strip when the screw is being driven. By constructing the ring 14 in the manner illustrated in FIG. 3, somewhat as in the lead of a thread and with the ends spaced from each other, a lateral force will be provided for retaining the end sections is and 16 in engaged relationship when moved to the position illustrated in FIG. 4. The diameter of the ring will be reduced when the aperture 26 of the flange 21 is inserted over the nib 25 so that tension will be provided by the effort of the ring to expand for maintaining the flange engaged with the nib. When assembled in this manner, a stable driving connection is provided to the ring which permits the ready assembly of the ring onto the tube 12 prior to or after its insertion over the sleeve 13.

I claim:

1. In a ring clamp, a wire body shaped in the form of a circle with the ends bent at right angle in the plane of the ring to extend outwardly of the ring and bent laterally in opposite directions sidewardly of said plane, said ends being flattened to form flanges disposed in parallel relation to each other normal to the plane of the ring, each of said flanges having an aperture, the aperture through one flange having threaded means associated therewith, and a screw having a driving head at one end and a nib at the opposite end screwed into said threaded means with the nib extending above the wire body, the aperture through the other of said flanges receives said nib, the driving of the screw to increase the spacing of the flanges reduces the diameter of the ring to produce a clamping operation the flattened ends being so related that when disconnected are in V-relationship and when connected by said screw are in X-relationship.

* * * * *